Dec. 29, 1964 E. G. EARLE 3,163,086
SINE BAR CONTROLLED ROTARY WORK TABLE
FOR CAM CUTTING AND LAYOUT
Filed Jan. 16, 1963 3 Sheets-Sheet 1

INVENTOR.
EDWARD G. EARLE
BY

INVENTOR.
EDWARD G. EARLE
BY

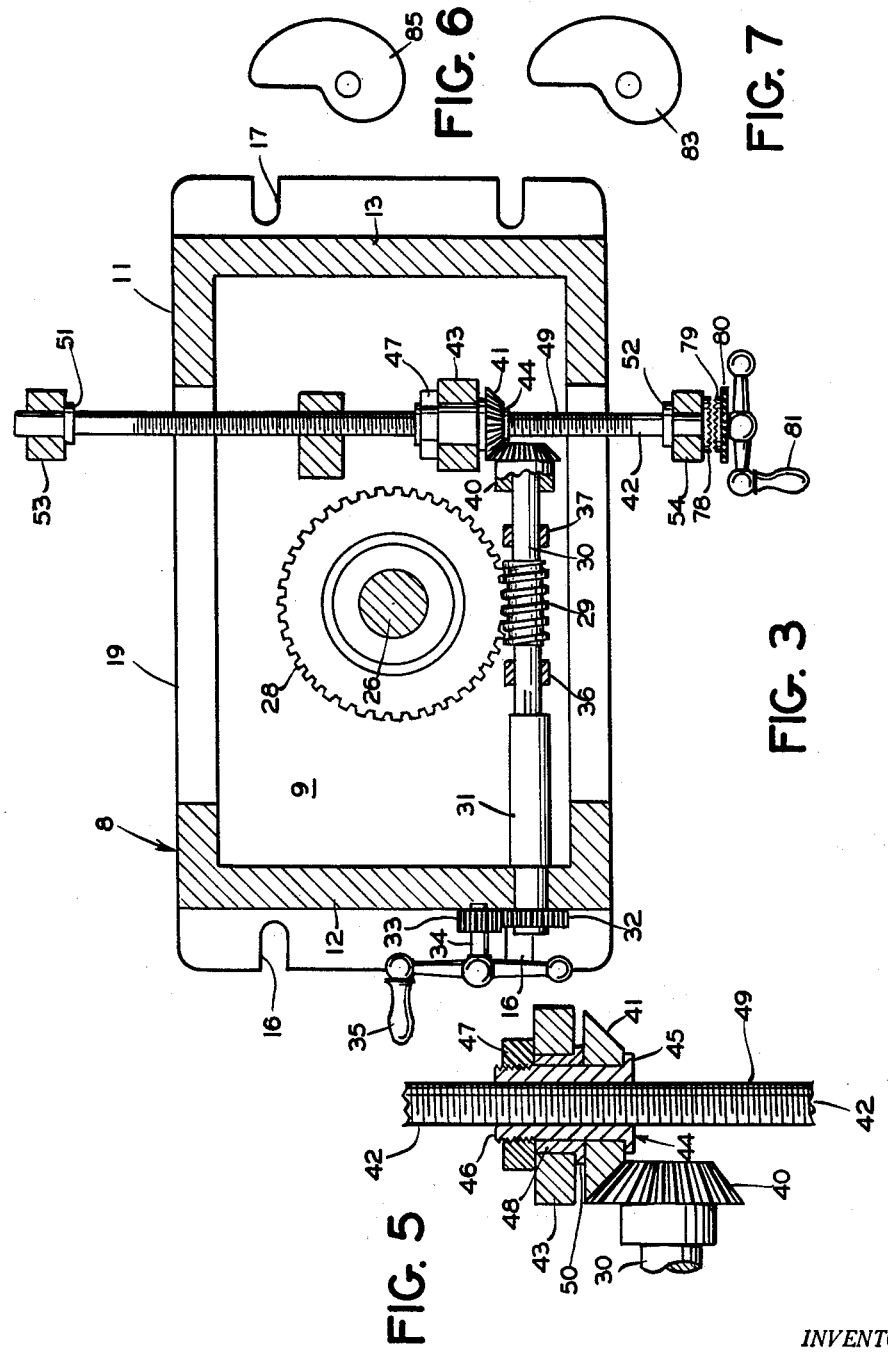

Patented Dec. 29, 1964

3,163,086
SINE BAR CONTROLLED ROTARY WORK TABLE
FOR CAM CUTTING AND LAYOUT
Edward G. Earle, R.D., Highland Mills, N.Y.
Filed Jan. 16, 1963, Ser. No. 251,982
15 Claims. (Cl. 90—20)

This invention relates to devices and apparatus for guiding and generating the profiles of cams when laying out and cutting cams on cam cutting machines and the like.

The main object of my invention is to provide a sine bar controlled work table for cam cutting and layout, which forms a removable unit adapted to be mounted upon a cam cutting machine or other machine capable of being used for cutting operations.

An ancillary object of the invention is to have a sine bar controlled and guided rotary work table upon which a cam blank may be mounted for the cutting or layout operation.

It is also an object of my invention to provide such a unit with manual adjusting means for quick return of the work table and work piece thereon to starting position and also return the sine bar to starting position, and otherwise adjust the device as required.

A practical object of this invention is to provide the device embodying the invention with a special supporting base which may be secured in place upon the platen or work table of a miller or other cutting machine.

A related object of the invention is to incorporate the unit of the invention in the structure of a complete independent machine as part and parcel thereof.

It is an important object of my invention to provide means as outlined for drawing or tracing involute curves directly and making it not only possible but routine to forecast the generation of a cam outline or profile by a setting, and for generating all profiles.

It is even an object of the invention to utilize as part of the operating means an articulated triangle, with a sine bar forming one of the three sides thereof and a feed screw for adjusting the sine bar forming another side of said triangle.

Other objects and advantages of my invention will appear in greater detail as the specification proceeds.

In order to facilitate clear comprehension of this invention for a proper appreciation of the salient features thereof, the invention is illustrated on the accompanying drawings forming part hereof, and in which:

FIGURE 3 is a horizontal longitudinal section of the same unit as taken on line 3—3 in FIGURE 1;

FIGURE 5 shows a fragmentary section of a detail;

FIGURE 6 shows a conventionally produced profile cam; and

FIGURE 7 shows a similar cam produced with the aid of the present invention.

Throughout the views, the same reference numerals indicate the same or like parts and features.

Figure 1:
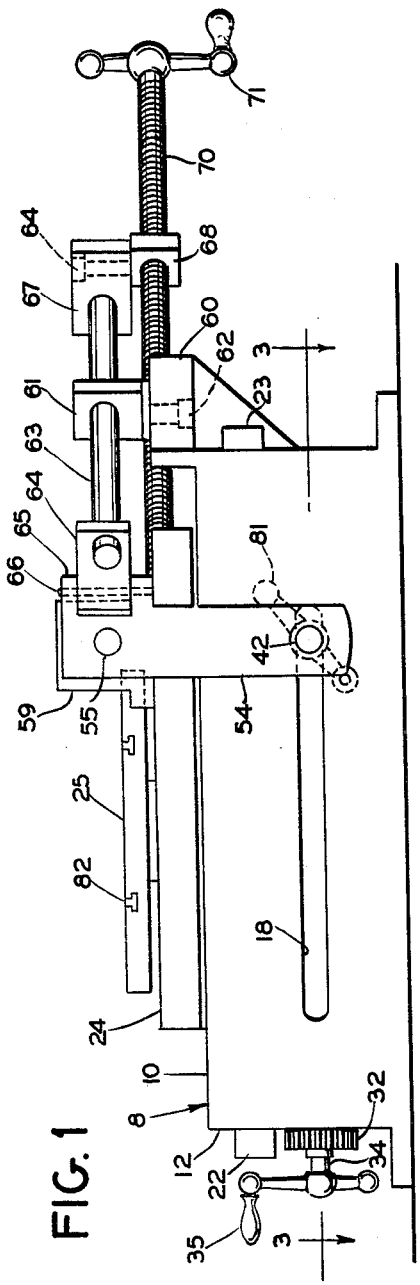
FIGURE 1 is a front elevation of a sine bar controlled rotary table unit made according to my invention and embodying the same in a practical form.

When laying out and/or cutting profile cams by conventional methods and means, which mainly includes hand filing, etc., various inaccuracies and bad spots on the work result, and the net result is altogether makeshift in character. Such imperfect work is tolerated only because nothing better is known in this field up to now. Upon considering this problem, it has occurred to me that a special guiding device should be available for cam layout and cutting operations which utilizes an articulated triangle having one side formed by a sine bar which is adjustable as well as the two other sides of the triangle, one of the latter taking the form of a feed screw, while additional adjusting means and appurtenances are included, as will now be set forth in detail in the following, due reference being had to the drawings already mentioned.

Hence, in the practice of my invention, I provide a base, generally indicated at 8 having a bottom 9, upstanding side walls 10, 11 and upright end walls 12 and 13, while bottom end lugs have bolt slots 16, 16, 17, etc., allowing this base to be secured in place upon a machine work table by anchoring bolts in conventional manner. In the side walls are provided a pair of horizontal clearance slots 18, 19 for a projecting feed shaft, to be further described. However, the side walls 10, 11 are higher than end walls 12 and 13, and upon the upper edges of the latter are cut two V-grooves 20, 21, etc., upon the upper horizontal level or plane on each end wall.

Figure 4:
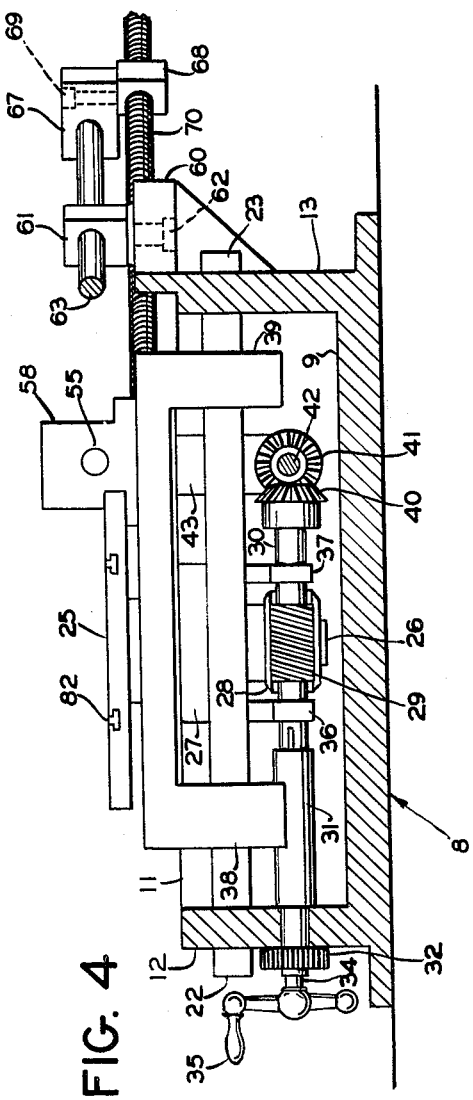
FIGURE 4 is a vertical longitudinal section of the unit as taken on line 4—4 in FIGURE 2.

The four resulting grooves form seats for receiving horizontal supporting studs 22, 23 projecting from the two opposite ends of a slidable work carriage 24 to provide for linear horizontal accurate movement back and forth longitudinally, as governed by further means to be described. Upon this carriage is provided a rotary work table 25 mounted on a vertical shaft 26 supported in a bearing 27 provided with worm gear 28 meshing with a worm 29 upon a horizontal shaft 30 having a splined shaft 31 into which it telescopes so as to turn positively and always therewith. Splined shaft 31 extends out through end wall 12 and has a gear 32 thereon meshing with a pinion 33 on a short shaft 34 provided with an adjusting crank 35 for manually turning shaft 30, as will appear later on. Upon the inner end of this shaft is fixed a bevel gear 40 meshing with a second bevel gear 41 fixed on an internally threaded thimble 44 having an end flange 45, with the other end 46 threaded and provided with a nut 47 (FIGURE 5). Thimble 44 is mounted in a collar 48 rotatable in a pendent support 43 depending rigidly from carriage 24 (FIGURES 3 and 4). In line with collar 48 is the bevel gear 41, the length of the collar being sufficient to clamp both collar and gear 41 firmly between nut 47 and thimble flange 45 while allowing rotation of the resulting ensemble as a floating nut in support 43, the thimble rotating and traveling threadwise along the thread 49 on feed shaft 42. Collar 48 has a spacing flange 50 made thin to allow rotation as stated.

The feed shaft 42 extends out from side walls 10 and 11 thru slots 18 and 19 therein and at their end portions rotate in end thrust bearings 51, 52 in depending angle brackets 53, 54 secured upon the two ends of a slidable horizontal rod 55 by pins 56, 57. This rod is supported for sliding movement in a pair of spaced apart pillow blocks 58, 59 fixed upon the top of slidable carriage 24 at one side of rotary work table 25. Rod 55 and pendent brackets 53, 54 and lower feed shaft 42 together form a floating frame which controls the position of the carriage 24 along its studs in grooves 20, 21 in accordance with further means now to be disclosed. Thus, upon front end wall 13 is fixed a pivot support 60 upon which a swiveling bearing block 61 is mounted, with the pivot 62 thereof fitting rotatably in the support, the block having a sine bar 63 extending slidably through the same and terminating at the near end in an end block 73 swiveling in the bifurcated upper end 65 of bracket 54 on pivot pin 66. At the far end, bar 63 has a second end block 67 secured thereon, with the pivot 69 of a depending swivel block or nut 68 extending rotatably up into end block 67. An adjusting feed screw 70 is screwed through swiveling nut 68 and at the outer end carries an adjusting crank 71. At the other inner end, this feed screw rotates in captive manner in a swiveling end bearing block 75 pivoting on pivot 76 in upper end 77 of far bracket 53. The entire superstructure thus described forms a connected control system in which the carriage 24 with its rotary work table 25 is moved various distances from pivot 61.

Figure 2:
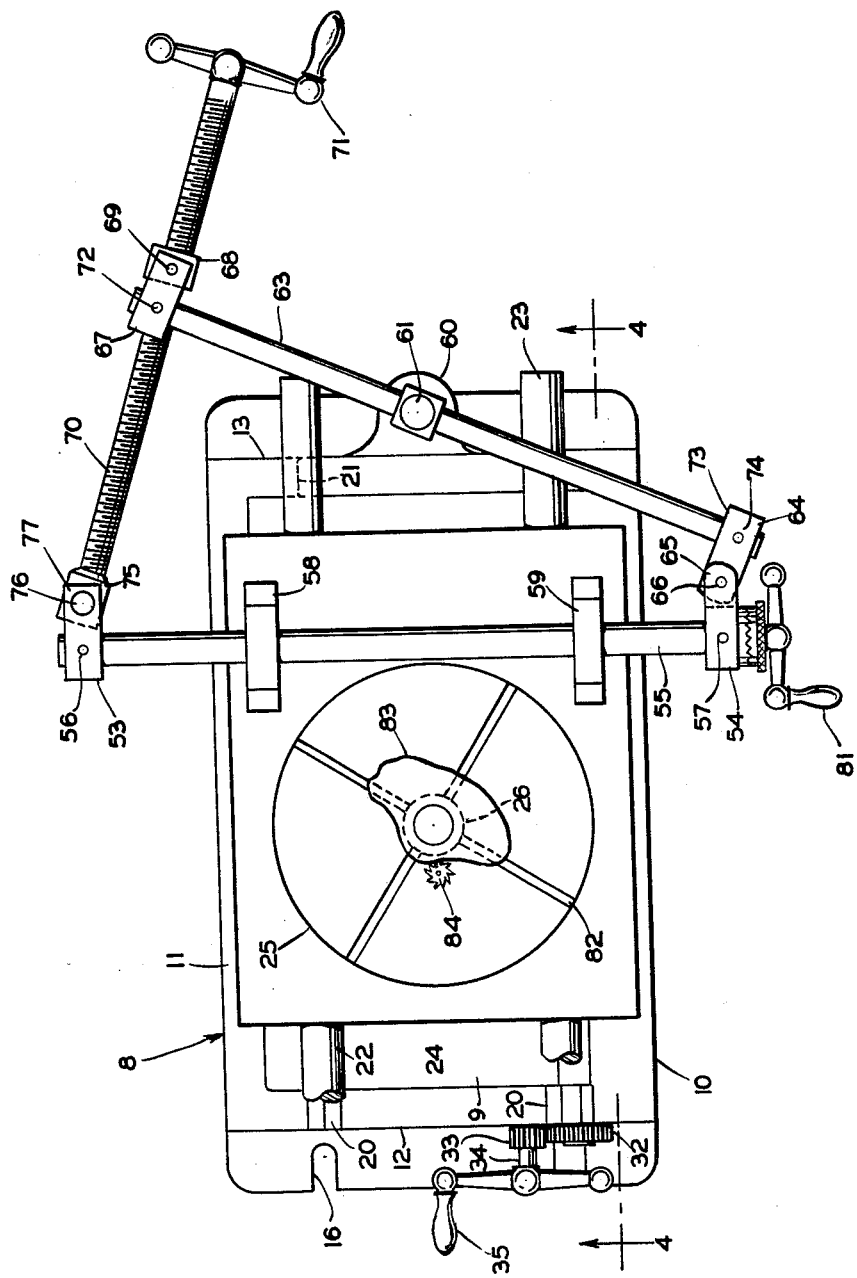
FIGURE 2 is a top plan view or elevation of the same unit as seen from above in FIGURE 1.

The lower transverse feed shaft 42 has an adjusting crank 81 and a face clutch 78 on bracket 54, as well as a cooperating clutch plate 79 with a tightening and releasing nut 80 to fix or release shaft 42 at will. This lead screw 42 has its thread cut in a 1 to 1 ratio to worm 29 and its effective length is equal to the circumference of said worm plus the width of base 8 to allow for free movement of the system. In addition, feed crank 35 with its gearing 32, 33 is arranged for one turn to each inch on turn table 25, this feed crank serving as drive means for the apparatus, in the sense of turning and holding the turntable 25 and any object upon it as guided and controlled by the sine bar system. The arrangement is such that if a cam blank 83 is mounted centrally upon turn table 25 (FIGURE 2), and duly secured in place by clamps held by bolts engaging in slots 82, rotary cutter 84 driven by power means for rotation about a vertical axis will cut the cam when the table is rotated about a parallel axis by manually and slowly turning operating crank 35. This turns shaft 30, 31 which by worm thereon turns worm 29 gear 28 and table 25. With worm shaft 30, bevel gear 40 also rotates and this likewise rotates bevel gear 41, best seen in FIGURE 5, showing how floating nut 44 feeds along lead screw or shaft 42 when its gear 41 is rotated by gear 40 if said lead screw is held in any way, but normally when free, this lead screw rotates in unison with gear 41 and nut 44 in carriage bearing 43. When thus free, handle 81 serves for quickly returning the sine bar system to starting position.

When the sine bar is to be brought into play, the lead screw 42 is locked by turning ring nut 80 to mutually engage face clutch members 78 and 79 so that nut 44 rotates upon the lead screw and feeds it along through bearing 43. This moves brackets 53 and 54 with upper rod 55, and sine bar 63 as guided through pivot block 61, thus moving the carriage accordingly in longitudinal direction perpendicular to the axis of rotation of cutter 84 for guided cutting of the cam on table 25 while the same also rotates from handle 35. Dwells are also produced on the cam when the lead screw is thus locked.

When a different cam is to be cut, handle 71 is turned to bring sine bar adjusting screw 70 to a new setting and the cutting proceeded with. Instead of the current filed outline for a cam 85 of FIGURE 6, the cam 83 (FIGURE 7) as now produced with this invention is smooth, has a completely generated outline, and is produced from a setting, while being both accurate and speedily cut.

Manifestly, variations may be resorted to, and parts and features may be modified or used without others within the scope of the appended claims.

Having now fully described my invention, I claim:

1. A sine bar controlled work table for cam cutting and/or layout, including a support, a supporting member mounted upon the support for movement in two opposite directions, a work table rotatably mounted upon the supporting member, a swiveling bearing member pivotally mounted at one end of the path of movement of said supporting member, means for rotating the work table, a sine bar extending slidably through the bearing member, and articulated means interconnecting two spaced apart portions upon the sine bar and the supporting member, bearing means being fixed upon the supporting member and an elongated member extending slidably through the bearing means transversely to the path of movement of said supporting member and connected to the ends of the sine bar, one end of the sine bar being pivotally connected to one end of the elongated member and a nut pivotally mounted on the other end of the sine bar with an adjusting feed screw extending through said nut and having an end bearing for the other end of said elongated member pivotally connected to the latter and said feed screw, the feed screw having an outer free end provided with a handle for rotating it.

2. Apparatus according to claim 1, wherein the work table has a spindle provided with a worm gear and a longitudinal shaft having a worm meshing with said gear is rotatably mounted upon the support parallel to the path of movement of the support member below said work table, and crank means upon said support connect with said shaft.

3. Apparatus according to claim 2, wherein the sine bar, feed screw and elongated member together form an articulated triangle or floating frame in which the side formed by the feed screw is variable in length to alter the angles between the sine bar and the elongated member.

4. Apparatus according to claim 3, wherein a pair of bearing members depend rigidly from the ends of the elongated member and rotatably support a feed shaft beneath the latter, while a nut is operably mounted upon said feed shaft with means fixed upon the support member for rotatably supporting said nut while preventing axial travel thereof, and means for rotating said nut and thereby axially displacing feed shaft.

5. Apparatus according to claim 4, wherein the worm on the longitudinal shaft has a one to one ratio to the transverse feed shaft and the effective length of the latter at least equals the circumference of the worm gear plus the width of the support.

6. Apparatus according to claim 4, wherein the nut has a gear rigid therewith, and the longitudinal shaft has a corresponding gear meshing with the gear on said nut.

7. Apparatus according to claim 6, including means for locking the feed shaft at will.

8. Apparatus according to claim 7, including a handle member upon the feed shaft externally of the support, and a manually operable clutch upon said feed shaft for locking or releasing said feed shaft at will.

9. Apparatus according to claim 8, wherein the support comprises end walls and side walls connected thereto while one end wall has a pivot mounting for the swiveling bearing member, and the side walls have long slots thru which the ends of the feed shaft project.

10. Apparatus according to claim 8, wherein the movable supporting member comprises a slidably mounted carriage carrying the work table, worm gear and bearings for the transverse feed shaft and for the nut thereon as well as for the longitudinal shaft.

11. A sine bar controlled work table for cam cutting and/or layout, including a support, a supporting member mounted on the support for movement in two opposite directions, a work table rotatably mounted on the supporting member, means for rotating the work table, a bearing member mounted at one end of the path of movement of the supporting member, a sine bar slidable through the bearing member, bearing means fixed upon the supporting member, and means interconnecting two spaced apart portions of the sine bar to the supporting member and including an elongated member slidable through the bearing means for movement transversely to the direction of movement of the supporting member.

12. Apparatus according to claim 11 in which the bearing member is pivotally mounted on the support and the interconnecting means is articulated to provide for changing the angular position of the sine bar relative to the direction of movement of the supporting member.

13. Apparatus for making cams, comprising cutter means rotatable about an axis, means for rotating the cutter means, a support, a supporting member mounted on the support for linear movement at right angles to the axis of the cutter means, a work table mounted on the supporting member for rotation about an axis parallel to the axis of the cutter means, means for rotating the work table, a bearing member mounted on the support, a sine bar slidable through the bearing member, bearing means fixed upon the supporting member, and means interconnecting two spaced apart portions of the sine bar to the supporting member and including an elongated member disposed at an angle to the sine bar and slidable through the bearing means for movement transversely to the path of movement of the supporting member, and means for sliding the elongated member through the bearing means and for sliding the sine bar through the bearing member to impart movement to the supporting member.

14. Apparatus according to claim 13 in which the bearing member is pivotally mounted on the support and the interconnecting means includes means for changing the relative angular position of the elongated member and sine bar.

15. A sine bar controlled work table for cam cutting and/or layout including a support, a supporting member mounted on the support for movement in two opposite directions, a work table rotatably mounted on the supporting member, a bearing member mounted at one end of the path of movement of the supporting member, a sine bar slidable through the bearing member, bearing means fixed upon the supporting member, means interconnecting two spaced apart portions of the sine bar to the supporting member and including an elongated member disposed at an angle to the sine bar and slidable through the bearing means for movement transversely to the direction of movement of the supporting member, and means for simultaneously rotating the work table and sliding the elongated member and sine bar through the bearing means and bearing member, respectively, to move the supporting member.

References Cited in the file of this patent

UNITED STATES PATENTS

| | | |
|---|---|---|
| 2,366,993 | Antos | Jan. 9, 1945 |
| 2,432,161 | Johnston | Dec. 9, 1947 |
| 2,435,900 | Perez | Feb. 10, 1948 |
| 2,990,753 | Spohn | July 4, 1961 |

FOREIGN PATENTS

| | | |
|---|---|---|
| 423,630 | Italy | July 19, 1947 |
| 862,540 | Great Britain | Mar. 15, 1961 |